United States Patent [19]

Buetemeister

[11] Patent Number: 4,829,228
[45] Date of Patent: May 9, 1989

[54] DUAL GENERATOR ELECTRICAL SYSTEM

[75] Inventor: Earl H. Buetemeister, Alexandria, Ind.

[73] Assignee: General Motors Corporation, Detroit, Mich.

[21] Appl. No.: 190,852

[22] Filed: May 6, 1988

[51] Int. Cl.⁴ .......................... H02J 7/14; H02P 9/30
[52] U.S. Cl. ......................................... 322/27; 307/84; 322/25; 322/90
[58] Field of Search ............... 322/25, 27, 90; 320/15; 307/16, 84

[56] References Cited

U.S. PATENT DOCUMENTS

| | | | |
|---|---|---|---|
| 2,504,768 | 4/1950 | Watson et al. | 290/4 |
| 4,336,485 | 6/1982 | Stroud | 320/15 |
| 4,347,473 | 8/1982 | Stroud | 320/15 |
| 4,509,005 | 4/1985 | Stroud | 320/68 |
| 4,539,515 | 9/1985 | Morishita et al. | 320/17 |
| 4,604,565 | 8/1986 | Yokota et al. | 320/15 |
| 4,661,760 | 4/1987 | Goto et al. | 322/27 |

Primary Examiner—R. J. Hickey
Attorney, Agent, or Firm—C. R. Meland

[57] ABSTRACT

A motor vehicle electrical system that has two alternating current generators for supplying current to the electrical loads on the vehicle including a storage battery. Both alternating current generators are connected to rectifier means which supply direct current to the loads. The output voltage of one of the generators is controlled by a voltage regulator. The direct current output of the rectifier means is sensed and the field current of the other generator is controlled such that its output current is slaved to and follows the output current of the generator that is controlled by the voltage regulator.

9 Claims, 2 Drawing Sheets

DUAL GENERATOR ELECTRICAL SYSTEM

This invention relates to a dual generator system wherein a pair of generators supply current to a common electrical load.

The continued demand for more electrically driven accessories on a motor vehicle makes it difficult to supply all the power to the electrical loads on a motor vehicle from a single generator since there is a limit to the amount of power that can be developed by a single generator. A possible solution to the problem of supplying adequate power to the electrical loads is to use two generators instead of one.

In general, dual generator electrical systems are known, examples being the systems disclosed in the U.S. Pat. Nos. 2,504,768 to Watson et al.; 4,539,515 to Morishita et al.; 4,604,565 to Yokota et al. and 4,347,473 to Stroud. Further, the U.S. Pat. No. 4,509,005 to Stroud discloses a single regulator for a dual alternator system and the U.S. Pat. No. 4,661,760 to Goto et al. discloses a regulating system for a generator that senses generator current.

The present invention is concerned with providing a dual generator system where both generators supply current to a common electrical load and wherein only one of the generators has its output voltage controlled by a voltage regulator. The system of this invention has a load proportioning control which senses the output currents of both generators. In response to the sensing of the output currents of the two generators, the system controls the field current of the generator that does not have a voltage regulator such that the output current of that generator follows and is slaved to the prevailing output current level of the generator that has its output voltage controlled by a voltage regulator.

It accordingly is an object of this invention to provide a dual generator power supply system wherein only one of the generators is controlled by a voltage regulator and wherein the field current of the other generator is controlled such that the output current of that generator follows and is slaved to the prevailing output current level of the generator that is controlled by the voltage regulator.

Another object of this invention is to provide a motor vehicle electrical system that has a plurality of electrical loads including a storage battery and wherein two generators are used to supply current to the vehicle electrical loads. The output voltage of one of the generators is controlled by a voltage regulator so that the voltage applied to the electrical loads, including the storage battery, is regulated by the voltage regulator. The field current of the other generator is controlled such that the output current of this other generator is slaved to and follows the output current of the generator that is regulated by the voltage regulator. In carrying this object forward, the generators are preferably alternating current generators having output windings connected to rectifier means.

IN THE DRAWINGS

Figure 1:
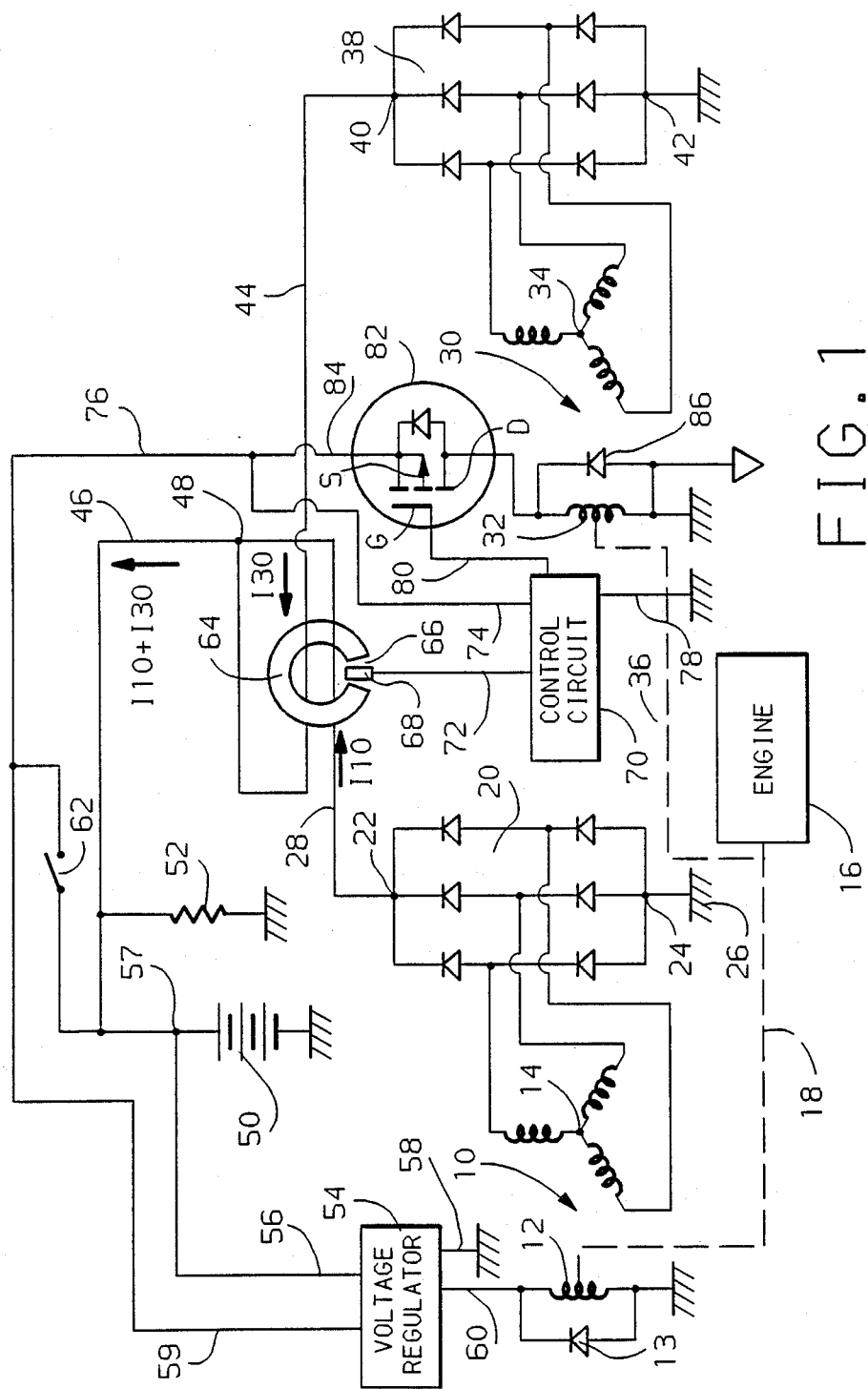
FIG. 1 is a schematic circuit diagram of a motor vehicle electrical system made in accordance with this invention.
Figure 2:
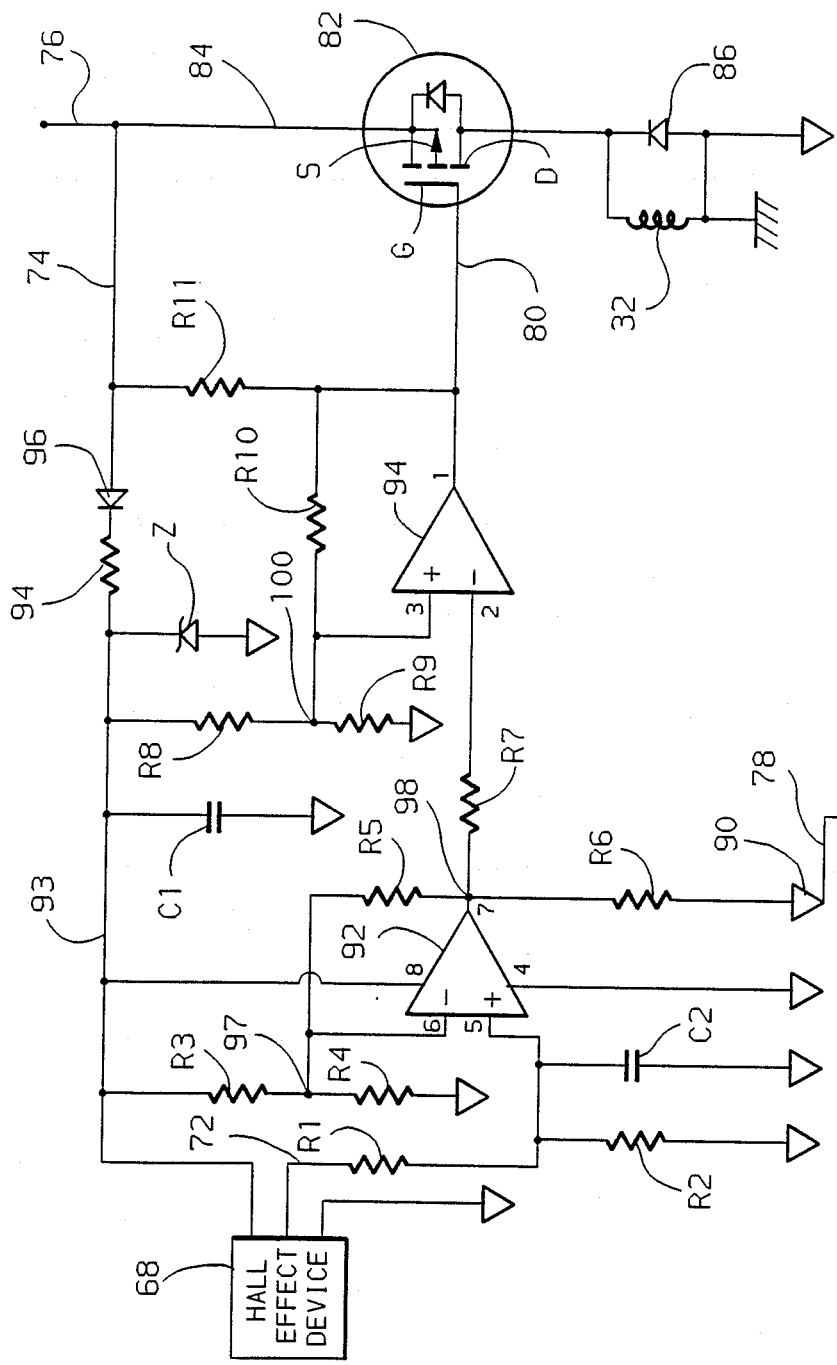
FIG. 2 is a schematic circuit diagram of a control circuit which is used in the system of FIG. 1.

Referring now to the drawings, and more particularly to FIG. 1, the reference numeral 10 generally designates an alternating current generator which has a field winding 12 and a three-phase Y-connected stator winding 14. A field discharge diode 13 is connected across field 12. The field winding 12 is carried by the rotor of generator 10 and the rotor is driven by the engine 16 of a motor vehicle as indicated by dotted line 18. The generator 10 may be of the type disclosed in the U.S. Pat. No. 4,604,538 to Merrill et al. The stator or output winding 14 is connected to a three-phase full-wave bridge rectifier 20 which has a positive direct voltage output terminal 22 and a negative direct voltage output terminal 24. The negative direct voltage terminal 24 is connected to power ground identified by reference numeral 26. In FIGS. 1 and 2 all ground symbols, like the one identified by reference numeral 26, represent power ground. The positive direct voltage output terminal 22 is connected to a power supply conductor 28.

The system of FIG. 1 has another alternating current generator 30 that includes a field winding 32 and a three-phase Y-connected stator or output winding 34. The generator 30 may also be of the type disclosed in the above-referenced U.S. Pat. No. 4,604,538 to Merrill et al. The field winding 32 of generator 30 is carried by the rotor of the generator and the rotor is driven by engine 16 as indicated by dotted line 36.

The stator winding 34 is connected to a three-phase full-wave bridge rectifier 38 that has a positive direct voltage output terminal 40 and a negative direct voltage output terminal 42 Terminal 40 is connected to a power supply conductor 44 and terminal 42 is connected to power ground.

The power supply conductors 28 and 44 are both connected to a power supply conductor 46 at junction 48. A storage battery 50 has its positive terminal connected to conductor 46 and its negative terminal connected to power ground. The electrical loads on the motor vehicle are represented by resistor 52 and are connected between conductor 46 and power ground. It will be appreciated that the output current of generators 10 and 30 are both supplied to conductor 46 which in turn supplies current to battery 50 and loads 52.

The output voltage of generator 10 is controlled by a generator voltage regulator designated by reference numeral 54. The voltage regulator has a voltage sensing circuit that is connected between a voltage sense lead 56 and a lead 58 that is connected to power ground. This sensing circuit can be a resistive voltage divider. The sense lead 56 is connected to junction 57 and accordingly to the positive terminal of battery 50. The voltage regulator further has a field current energizing circuit connected between conductors 59 and 60 that includes a switching transistor. Lead 60 is connected to field winding 12 and lead 59 is connected to battery 50 via an ignition switch 62. The voltage regulator 54 may be of the type disclosed in the U.S. Pat. No. 4,636,706 to Bowman et al. and can take other forms.

The voltage regulator 54 senses the voltage between junction 57 and power ground and controls the magnitude of field current supplied to field winding 12 to maintain this voltage substantially constant. By way of example, in a 12 volt system the regulator may operate to maintain the voltage between junction 57 and power ground at a voltage of about 14 volts. The regulator accomplishes this by sensing the voltage between junction 57 and power ground and depending on the voltage sensed controls field current to maintain the voltage at junction 57 at a desired regulated value.

The field current for the field winding 32 of generator 30 is controlled by a load proportioning system which will now be described. This system comprises a current sensing means which includes a toroid 64 that is formed of magnetic material such as ferrite. The toroid 64 has a slot or gap 66 and located in the slot or gap 66 to sense the flux traversing the gap is a Hall effect sensor 68. The conductor 28, which carries the output current of generator 10, passes through toroid 64 as does the conductor 44 which carries the output current of generator 10. The output currents I10 and I30 of generators 10 and 30 flow in opposite directions as they pass through toroid 64 as indicated by the arrows in FIG. 1. This causes the magnetic fields surrounding each conductor to induce bucking or opposing flux fields in the toroid 64. Accordingly, the resultant flux that traverses air gap 66 and which links Hall device 68 will, be a function of the difference in the magnitudes of currents I10 and I30. This resultant flux will cause a voltage to be developed by Hall device 68, the magnitude of which is a function of the difference in currents I10 and I30.

The voltage developed by Hall device 68 is applied to a load proportioning control which is illustrated in detail in FIG. 2. A part of this control is control circuit 70 that is shown as a block in FIG. 1. The circuit 70 is connected to Hall device 68 by a conductor 72. Control circuit 70 is connected to conductors 74 and 76 and conductor 76 is connected to one side of the ignition switch 62. Control circuit 70 has a signal ground to be described in connection with FIG. 2 that is connected to power ground by conductor 78. Control circuit 70 is further connected to a conductor 80.

The conductor 80 is connected to the gate G of a P-channel field effect transistor 82. This transistor may be an RCA type RFK 25P10 field effect transistor. The source S of transistor 82 is connected to conductor 84 and the drain D is connected to one side of the field winding 32 of generator 30. The opposite side of the field winding is connected to power ground. A field discharge diode 86 is connected across field 32.

The circuit of FIG. 2, which includes control circuit 70, will now be described. In FIG. 2, the same reference numerals have been used as were used in FIG. 1 to identify corresponding parts.

In FIG. 2, the arrow-like symbol identified by reference numeral 90 and all like symbols represent signal ground. Signal ground is connected to power ground by conductor 78. Further, in describing FIG. 2, it will be on the basis that the system is a 12 volt system.

The FIG. 2 system has an integrated circuit containing an operational amplifier 92 and a voltage comparator 94. The pin numbers for these devices are shown in FIG. 2. This integrated circuit may be a National Semiconductor type LM 2924 device. The amplifier 92 amplifies the output voltage of Hall effect device 68. The Hall device 24 has positive voltage applied thereto by conductor 93, resistor 94 (110 ohms) and diode 96. A Zener diode Z having a breakdown voltage of 8.2 volts is connected between conductor 93 and signal ground. A capacitor C1 of 35 microfarads is connected between conductor 93 and signal ground.

The positive input terminal (pin 5) of amplifier 92 is connected to the conductor 72 and hence to the output of Hall device 68 by a 75 K resistor R1. Resistor R2 (75K) and capacitor C2 (0.01 microfarad) are connected between the positive terminal of amplifier 92 and signal ground.

Operational amplifier 92 is further connected to 150 K resistors R3 and R4, 75 K resistor R5 and 3K resistor R6. Resistors R3 and R4 form a voltage divider having a junction 97 connected to the negative input terminal (pin 6) of amplifier 92. The output of amplifier 92 is at junction 98 (pin 7).

Amplifier 92 is designed for unity gain in the differential channel and high common mode rejection in the common mode channels. This allows processing the output signal of Hall device 68 while providing good rejection to thermal drift.

The negative input terminal (pin 2) of voltage comparator 94 is connected to the output of amplifier 92 via a 750 ohm resistor R7. The positive input terminal (pin 3) of comparator 94 is connected to junction 100 between resistors R8 (59K) and R9 (750 ohms). Also connected to comparator 94 are resistors R10 (2.7M) and R11 (4.7 K).

The output of comparator 94 (pin 1) is connected to the gate G of field effect transistor 82 by conductor 80. The voltage divider resistors R8 and R9 provide a reference voltage at junction 100 that is applied to the positive input terminal (pin 3) of comparator 94. The voltage at the negative input terminal (pin 2) of comparator 94 varies in accordance with variation in the output voltage of Hall device 68.

The operation of the system will now be described, first from a general standpoint and then in more detail. Fundamentally, the load proportioning system of this invention operates to sense the output current I10 and I30 of generators 10 and 30. If there is a difference, for example I10, being greater than I30, the system controls the field current of generator 30 such that its output current will be increased until the magnitude of I30 substantially equals I10. The current output of generator 30 accordingly is slaved to the prevailing current output of generator 10. Putting it another way, the output current of generator 30 follows or tracks the output current of generator 10. It should be apparent that the generator 30 does not have a voltage regulator like the regulator 54 that regulates the output voltage of generator 10.

A more detailed operation of the system of this invention will now be given. Let it be assumed that generators 10 and 30 are supplying currents I10 and I30 and that I10 is greater than I30. The flux generated in toroid 64 will be related to the difference in the current levels of I10 and I30. The net flux that is applied to Hall device 68 will cause it to develop an output voltage that is a function of the difference in output currents I10 and I30. This voltage is applied to operational amplifier 92 and its output will be a voltage that is a function of the difference in the output currents I10 and I30.

The output voltage of amplifier 92 is applied to one input terminal (pin 2) of voltage comparator. This comparator 94 compares this voltage with a reference voltage applied to pin 3 from junction 100. The system is arranged such that when the voltage applied to pin 2 of comparator 94 is higher than the reference voltage, the output of comparator 94 goes low, or in other words, connects conductor 80 to signal ground which drives the gate G of transistor 82 low which in turn causes transistor 82 to be biased conductive between its source and drain thereby energizing field 32 of generator 30 from conductor 84. With the field 32 energized, the output current I30 will start increasing, causing the voltage applied to the negative input terminal (pin 2) of comparator 94 to start decreasing. When this voltage decreases to a point where it is less than the reference voltage (pin 3) the output of comparator 94 will switch out of the low condition. A positive voltage is now applied to gate of FET 82 from line 74 via resistor R11 and conductor 80 which will cause transistor 82 to be biased nonconductive between its source and drain. Thus, transistor 82 will be switched off when current I30 substantially equals current I10. The system therefore switches transistor 82 on and off so as to maintain output current I30 substantially equal to I10.

It will be appreciated that when current I30 increases to a point where it substantially equals I10, a flux null is created in regard to the flux that links Hall device 68. This shuts off transistor 82. Once the field current of field 32 starts to decay the null in flux is disrupted. The resultant flux again increases which will again cause transistor 82 to be turned on. This constant hunting for a null allows the current sensor to operate over a huge dynamic range without going into saturation and to lock on and track the existing current level output of generator 10. It should be noted that the feedback between the output of comparator 94 and pin 3 (resistor R10) adds hysteresis about the current lock in point.

In the system as thus far described the output current I30 of generator 30 is controlled such that it follows and substantially equals current I10. This occurs because there is a one-to-one turns ratio between the flux developed in toroid 64 and the turns of conductors 28 and 44 that pass through the toroid 64. Thus, the straight conductor portions that pass through toroid 64 can be considered as one turn and there accordingly is a one-to-one turns ratio. The turns ratio can be made other than one-to-one so that the output currents I10 and I30 would not be substantially equal but rather would have a predetermined relationship or ratio. Thus, assume for example that conductor 44 instead of having one turn has two turns so that there is now a two-to-one turns ratio between conductor 44 and conductor 28. The result of such a modification would cause a greater flux to be induced in toroid 64 by the current in conductor 44 than would be induced by the same current in conductor 28. The system would now operate such that current I30 would still follow current I10 but current I30 would be less than current I10 by a predetermined constant value that is a function of the turns ratio. It therefore will be appreciated that this invention is not limited in application to a system wherein current I30 is controlled to be substantially equal to current I10.

The embodiments of the invention in which an exclusive property or privilege is claimed are defined as follows:

1. A dual generator system for providing electrical current to an electrical load comprising, a first generator having an output winding and a field winding, a second generator having an output winding and a field winding, an electrical load, means connecting the output windings of said generators to said electrical load such that each generator supplies current to said electrical load and such that the current supplied to the electrical load is substantially equal to the sum of the output currents of said generators, a voltage regulating means connected to the field winding of said first generator including means sensing the voltage across said load, said voltage regulating means operative to control the field current of said field winding of said first generator such that the output voltage of said first generator is regulated to a predetermined value, current sensing means operative to sense the output currents of said generators, said current sensing means including means for developing an electrical signal that is a function of relative magnitudes of the current outputs of said generators and means responsive to said signal for controlling the field current of the field winding of said second generator such that the output current of said second generator follows the output current of said first generator and such that there is a predetermined relationship between the output currents of said generators.

2. The dual generator system according to claim 1 wherein the current sensing means is so constructed and arranged that the output current of the second generator is regulated to a magnitude that substantially equals the output current magnitude of the first generator.

3. The dual generator system according to claim 1 where the first and second generators are alternating current generators and where the output currents of the generators are developed by rectifier means connected respectively to an output winding of a respective generator.

4. The dual generator system according to claim 1 where the means for controlling the field current of the field winding of the second generator comprises a semiconductor switching means that is connected in series with said second field winding of said second generator.

5. The dual generator system according to claim 1 where the current sensing means comprises a Hall device that is traversed by magnetic flux that is developed by the output currents of said first and second generators.

6. A dual generator vehicle power supply system comprising, a first alternating current generator having an output winding and a field winding, a second alternating current generator having an output winding and a field winding, first rectifier means connected to the output winding of said first generator, second rectifier means connected to the output winding of said second generator, a load circuit including a storage battery, means connecting the outputs of both rectifier means to said storage battery whereby both rectifier means can supply charging current to said battery, voltage regulating means connected to the field winding of said first generator having a voltage sensing means connected to said battery to sense the voltage across the battery, said voltage regulating means operative to control the field current of said field winding of said first generator to maintain the output voltage of said first rectifier means at a predetermined regulated value, current sensing means operative to sense the magnitudes of the output currents of said first and second rectifier means, and means responsive to said current magnitudes for controlling the field current of the field winding of said second generator such that the output current of said second rectifier means follows the output current of said first rectifier means and such that there is a predetermined relationship between the output currents of said first and second rectifier means.

7. A dual generator system for providing electrical current to an electrical load comprising, a first generator having an output winding and a field winding, a second generator having an output winding and a field winding, an electrical load, said output windings of said generators being connected to said electrical load such that both generators supply current to said electrical load, voltage regulating means coupled to the field winding of said first generator and to the output winding of said first generator for maintaining the output voltage of the output winding of said first generator at a predetermined regulated value, current sensing means operative to sense the output currents of said first and second generators, a field current control means coupled to the field winding of said second generator comprising a semiconductor switching means connected in series with the field winding of said second generator, said field current control means coupled to said current sensing means and including means for causing said semiconductor switching means to be biased conductive when the relative magnitudes of the output currents have a first relationship and for biasing said semiconductor switching means nonconductive when the relative magnitudes of the output currents of said generators have a second relationship that is different from said first relationship.

8. The dual generator system according to claim 7 which is arranged such that said first relationship corresponds to a condition of operation where the output current of the first generator is greater than the output current of the second generator and where said second relationship corresponds to a condition of operation where the output currents of said first and second generators are substantially equal.

9. The dual generator system according to claim 7 where the semiconductor switching means is a field effect transistor.

* * * * *